US011897107B2

(12) United States Patent
Ohno et al.

(10) Patent No.: US 11,897,107 B2
(45) Date of Patent: Feb. 13, 2024

(54) DRIVING TOOL

(71) Applicant: MAX CO., LTD., Tokyo (JP)

(72) Inventors: Tetsuya Ohno, Tokyo (JP); Takashi Suzuki, Tokyo (JP); Takanari Azami, Tokyo (JP)

(73) Assignee: Max Co., Ltd., Tokyo (JP)

( * ) Notice: Subject to any disclaimer, the term of this patent is extended or adjusted under 35 U.S.C. 154(b) by 0 days.

(21) Appl. No.: 17/740,973

(22) Filed: May 10, 2022

(65) Prior Publication Data

US 2022/0355456 A1 Nov. 10, 2022

(30) Foreign Application Priority Data

May 10, 2021 (JP) ................................ 2021-079565

(51) Int. Cl.
*B25C 1/06* (2006.01)

(52) U.S. Cl.
CPC ...................................... *B25C 1/06* (2013.01)

(58) Field of Classification Search
CPC ........................................................ B25C 1/06
See application file for complete search history.

(56) References Cited

U.S. PATENT DOCUMENTS 2,575,455 A * 11/1951 Lang ......................... B25C 1/06 227/138
4,721,170 A * 1/1988 Rees ......................... B25C 1/06 173/124
2008/0006672 A1* 1/2008 Tanimoto .................. B25C 1/06 227/132
2008/0237294 A1* 10/2008 Tanimoto .................. B25C 1/06 227/129
2008/0296339 A1* 12/2008 Fielitz ....................... B25C 5/15 227/107
2011/0303726 A1* 12/2011 Blessing ................... B25C 1/06 227/132
2012/0211540 A1* 8/2012 Kondou .................... B25C 1/00 227/140

(Continued)

FOREIGN PATENT DOCUMENTS

EP 2489474 A2 8/2012
JP 2012-236250 A 12/2012
JP 2018-202519 A 12/2018

OTHER PUBLICATIONS

Extended European Search Report for EP Application No. 22172441.2 dated Oct. 11, 2022. (5 pp.).

*Primary Examiner* — Anna K Kinsaul
*Assistant Examiner* — Lucas E. A. Palmer
(74) *Attorney, Agent, or Firm* — Banner & Witcoff, Ltd.

(57) ABSTRACT

A driving tool includes: a plunger movable in a first direction along a direction in which a fastener is launched; an urging member that is extendable and contractible in the first direction and serves as a drive source of the plunger; and guide rails configured to guide movement of the plunger in the first direction. The guide rails extend along the first direction of the urging member and are disposed on both sides sandwiching the urging member, and the guide rails are arranged such that a virtual line connecting the guide rails on the both sides of the urging member is deviated from a central axis of the urging member in a plan view of the urging member as viewed from the first direction.

6 Claims, 11 Drawing Sheets

(56) References Cited

U.S. PATENT DOCUMENTS

| | | | | |
|---|---|---|---|---|
| 2013/0153621 | A1* | 6/2013 | Franz | B25C 1/06<br>227/146 |
| 2017/0001291 | A1* | 1/2017 | Schnell | B25C 1/04 |
| 2020/0276690 | A1* | 9/2020 | Hegarty | B25C 1/06 |
| 2021/0060749 | A1* | 3/2021 | Yang | B25C 1/008 |
| 2021/0354277 | A1* | 11/2021 | Morimura | H02P 6/24 |
| 2022/0355453 | A1* | 11/2022 | Morimura | B25C 1/06 |
| 2022/0355454 | A1* | 11/2022 | Ohno | B25C 1/06 |
| 2022/0355455 | A1* | 11/2022 | Kondo | B25C 1/06 |
| 2022/0355456 | A1* | 11/2022 | Ohno | B25C 1/06 |

* cited by examiner

DRIVING TOOL

CROSS-REFERENCE TO RELATED APPLICATIONS

This application is based upon and claims the benefit of priority from prior Japanese patent application No. 2021-079565, filed on May 10, 2021, the entire contents of which are incorporated herein by reference.

TECHNICAL FIELD

The present invention relates to a driving tool.

BACKGROUND ART

A driving tool configured to electrically drive nails, studs, staples, pins, and the like (hereinafter referred to as "fasteners") is known. The driving tool includes, in a driving mechanism, a driver configured to launch a fastener, a plunger that holds the driver and is movable in a launch direction, and a coil spring that serves as a drive source of the plunger. Movement of the plunger in the launch direction is guided by a pair of guide rails provided on both sides of the coil spring. See JP-A-2012-236250 (hereinafter, referred to as Patent Literature 1).

However, the pair of guide rails of the plunger described above are disposed on both sides sandwiching a central axis of the coil spring. Therefore, a dimension of a lateral width of the fastener driving mechanism of the driving tool as described above is at least a sum of a diameter dimension of the coil spring and width dimensions of the pair of guide rails located outside the coil spring.

On the other hand, it is desired to reduce a size of the driving mechanism and a size of the driving tool so as to cope with fastener driving in narrow space.

The present invention has been made in view of the above circumstances, and an object thereof is to reduce a size of a driving tool.

SUMMARY

A driving tool according to one aspect of the present invention includes: a plunger movable in a first direction along a direction in which a fastener is launched; an urging member that is extendable and contractible in the first direction and serves as a drive source of the plunger; and guide rails configured to guide movement of the plunger in the first direction. The guide rails extend along the first direction of the urging member and are disposed on both sides sandwiching the urging member, and the guide rails are arranged such that a virtual line connecting the guide rails on the both sides of the urging member is deviated from a central axis of the urging member in a plan view of the urging member as viewed from the first direction.

According to the above aspect, since the guide rails are arranged such that a virtual line connecting the guide rails on the both sides of the urging member is deviated from the central axis of the urging member in the plan view of the urging member as viewed from the first direction, the guide rails is offset from the central axis of the urging member where an outer diameter thereof is maximum. As a result, a size of a driving mechanism of the driving tool is reduced, and thus a size of the driving tool is reduced.

In the above aspect, the driving tool may further include: a string-shaped member configured to transmit a driving force of the urging member to the plunger; and a pulley on which the string-shaped member is hooked. The guide rails may be arranged to overlap a rotation axis of the pulley in a side view of the pulley as viewed from a rotation axis direction thereof.

In the above aspect, the string-shaped member may pass through an inner side of the urging member in a central axis direction, protrude outward from one end portion of the urging member, and be connected to the plunger via the pulley.

In the above aspect, the guide rails may be fixed to a tool body, and the tool body may be provided with an inclination prevention portion that prevents the guide rails from inclining relative to the first direction.

In the above aspect, the urging member may be provided at a front portion of the tool body, and the guide rails may be arranged to be deviated toward a rear side of the tool body from the central axis of the urging member in the first direction in a side view as viewed from a side surface of the tool body.

In the above aspect, the plunger may be moved in the launch direction of the fastener by an extension operation of the urging member, and an extension direction of the urging member and the launch direction of the fastener may be opposite to each other.

According to the present invention, the size of the driving tool can be reduced.

DESCRIPTION OF EMBODIMENTS

Hereinafter, an embodiment of the present invention will be described with reference to the drawings. The following embodiment is an example for explaining the present invention, and is not intended to limit the present invention only to the embodiment.

Configuration of Driving Tool

Figure 1:
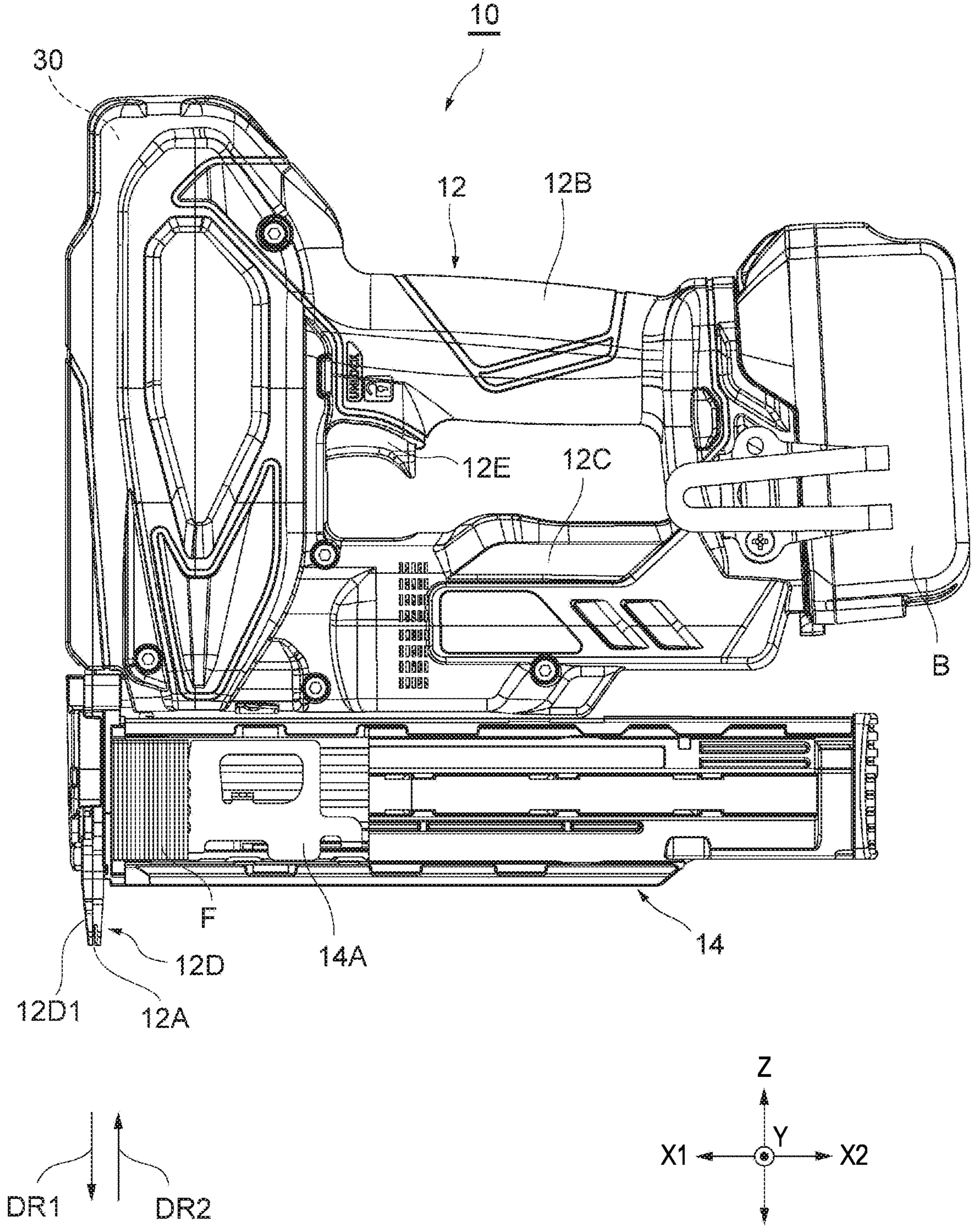
FIG. 1 is a side view of a driving tool according to an embodiment of the present invention.
Figure 2:
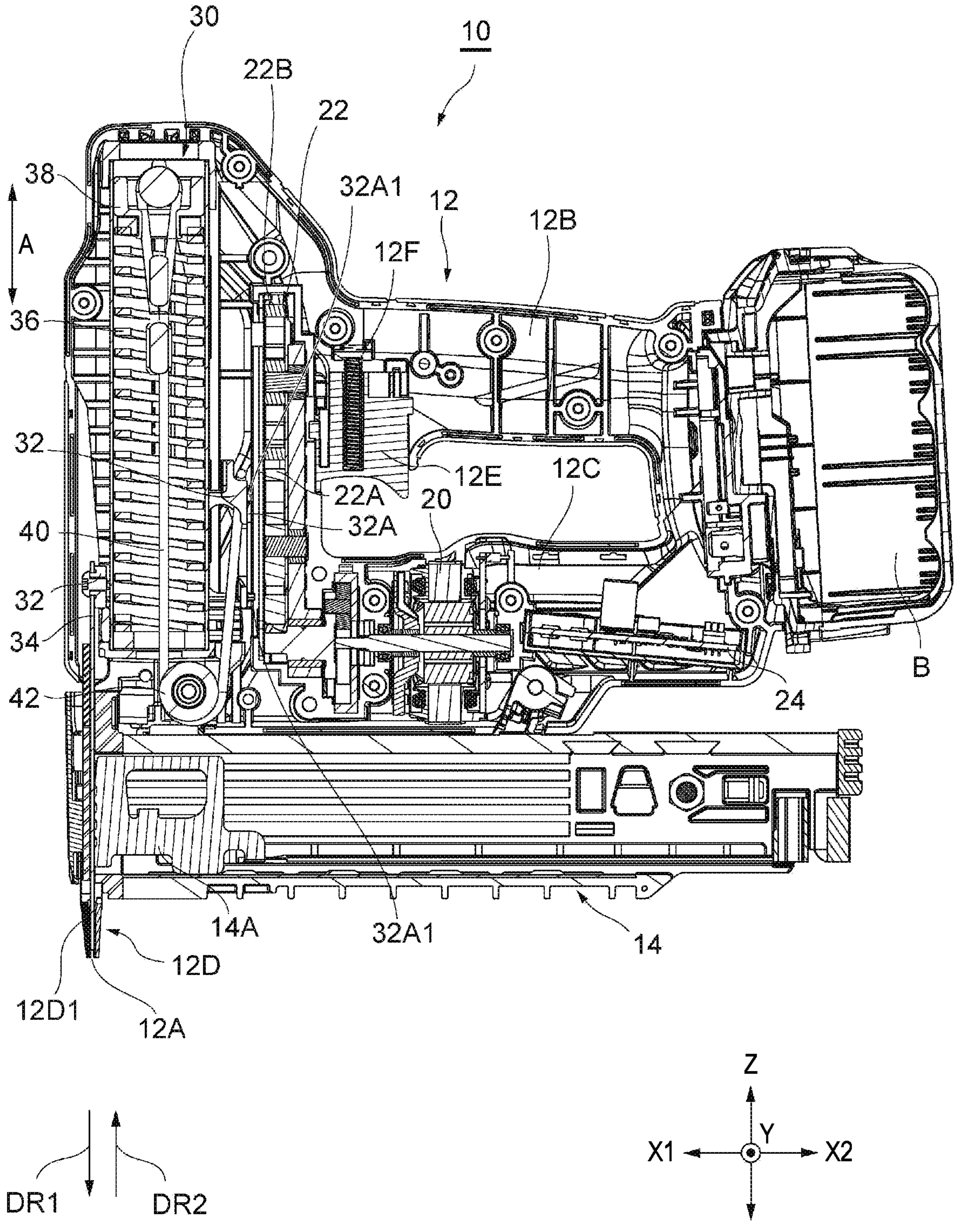
FIG. 2 is a cross-sectional view of the driving tool as viewed from a side surface.

FIG. 1 shows a side view of an electric driving tool 10 (however, a partial cross-sectional view of a magazine portion is shown). FIG. 2 is a cross-sectional view of the driving tool 10 as viewed from the same direction as FIG. 1

(however, a state after all fasteners F in a magazine 14 are launched is shown). The driving tool 10 is an electric nailer configured to be capable of driving a nail (an example of the "fastener F") by driving a plunger 32 (FIG. 2) through using a motor 20 (FIG. 2).

In the present specification, "up and down", "front and rear", and "left and right" are based on an attitude of the driving tool 10 in FIGS. 1 and 2. A left-right direction on paper in FIGS. 1 and 2 is defined as a front-rear direction X of the driving tool 10 (a leftward direction on paper is defined as a forward direction X1 of the driving tool 10, and a rightward direction on paper is defined as a rearward direction X2 of the driving tool 10), a direction perpendicular to paper in FIGS. 1 and 2 is defined as a left-right direction Y of the driving tool 10, and an up-down direction on paper in FIGS. 1 and 2 is defined as an up-down direction Z of the driving tool 10. A downward direction on paper in FIGS. 1 and 2 corresponds to a direction in which the fastener F is launched, and thus may be referred to as a launch direction DR1 or a projecting direction DR1. An upward direction on paper opposite to the launch direction DR1 may be referred to as a separating direction DR2 since the upward direction is a direction away from an outlet 12A where the fastener F is launched.

The driving tool 10 includes: a housing 12; the magazine 14 that accommodates the fastener F to be launched by the driving tool 10; a driver 34 configured to launch the fastener F; the plunger 32 to which the driver 34 is attached; the motor 20 and a gear 22 configured to move the plunger 32 from a bottom dead center to a top dead center; a coil spring 36 (an example of an "urging member") that applies a driving force for moving the plunger 32 from the top dead center to the bottom dead center; a moving member 38 disposed at an extended end portion of the coil spring 36; a wire 40 (an example of a "string-shaped member") that engages with the plunger 32 and the moving member 38 so as to interlock the plunger 32 and the moving member 38; and a pulley 42 (an example of a "direction changing member") on which the wire 40 is hooked. Further, a battery B is detachably attached to the driving tool 10.

The driving tool 10 includes the housing 12 (hereinafter, the housing 12 and a portion fixed to the housing 12 may be referred to as a "tool body") that accommodates main components of the driving tool 10 including the plunger 32. The housing 12 is provided with a grip portion 12B to be gripped by an operator, a bridge portion 12C connecting a certain portion of the motor 20 and an attachment portion of the battery B, and a nose portion 12D configured to launch the fastener F. The grip portion 12B is formed in, for example, a columnar shape extending in the front-rear direction X so as to be easily gripped by the operator. The bridge portion 12C is formed in a columnar shape extending in the front-rear direction X below the grip portion 12B. The nose portion 12D where the outlet 12A for launching the fastener F in the downward direction is formed is provided at a front end of the housing 12 (and a front end of the driving tool 10). A contact arm 12D1 may be attached to a tip end of the nose portion 12D. The contact arm 12D1 is provided around the outlet 12A so as to be capable of projecting and retracting from the outlet 12A, and functions as a safety device that permits the launching of the fastener F only in a state where the contact arm 12D1 is pressed against a driving destination object while a trigger 12E is pressed.

The housing 12 is provided with the trigger 12E. The trigger 12E allows the battery B and the motor 20 to be electrically connected to each other when a user presses the trigger 12E. The trigger 12E is provided to be exposed on a surface that faces downward (toward the launch direction DR1 of the fastener F) of the grip portion 12B, and is urged downward by a trigger urging member 12F such as a spring, for example.

The battery B is configured to be detachably attached to rear end portions of the grip portion 12B and the bridge portion 12C. The battery B functions as a DC power supply that supplies electric power for driving a motor or the like, and is formed of, for example, a lithium ion battery capable of outputting a predetermined (for example, 14V to 20V) DC voltage. The driving tool 10 can be carried and used when the battery B is attached. However, the battery B may also be configured to be accommodated in the housing 12, or the electric power may also be supplied by means other than the battery.

The driving tool 10 includes the magazine 14 attached behind the nose portion 12D. The magazine 14 is configured such that a plurality of the fasteners F (FIG. 1) connected to each other can be loaded therein. The magazine 14 includes a pusher 14A that urges each fastener F toward the nose portion 12D. The pusher 14A is urged by an urging member (not shown) such that, when a leading fastener F is launched by the driver 34, an adjacent fastener F is supplied to a projecting path of the nose portion 12D.

Figure 3:
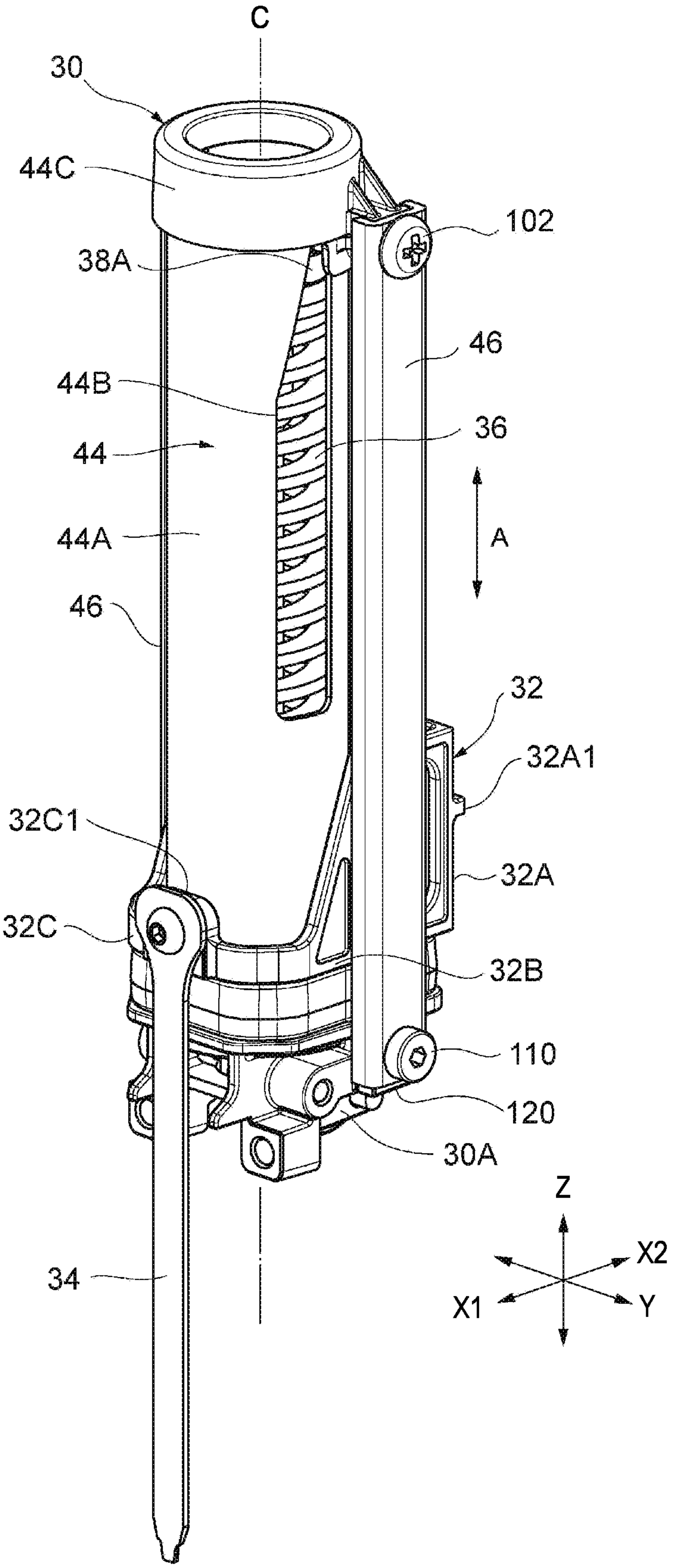
FIG. 3 is a perspective view of a plunger assembly.
Figure 4:
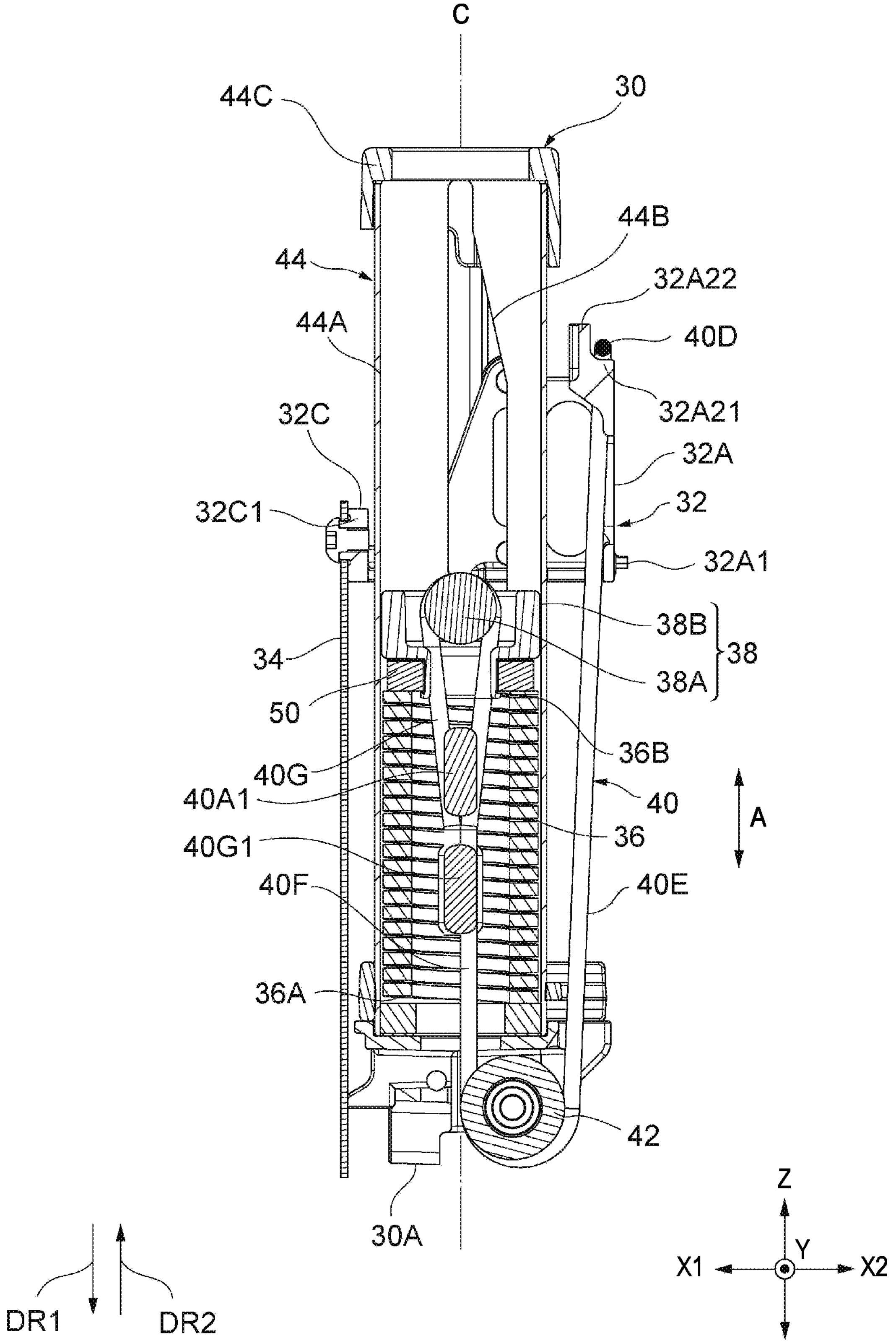
FIG. 4 is a cross-sectional view of the plunger assembly in a state where a coil spring is contracted when the plunger assembly is viewed from a side surface.
Figure 5:
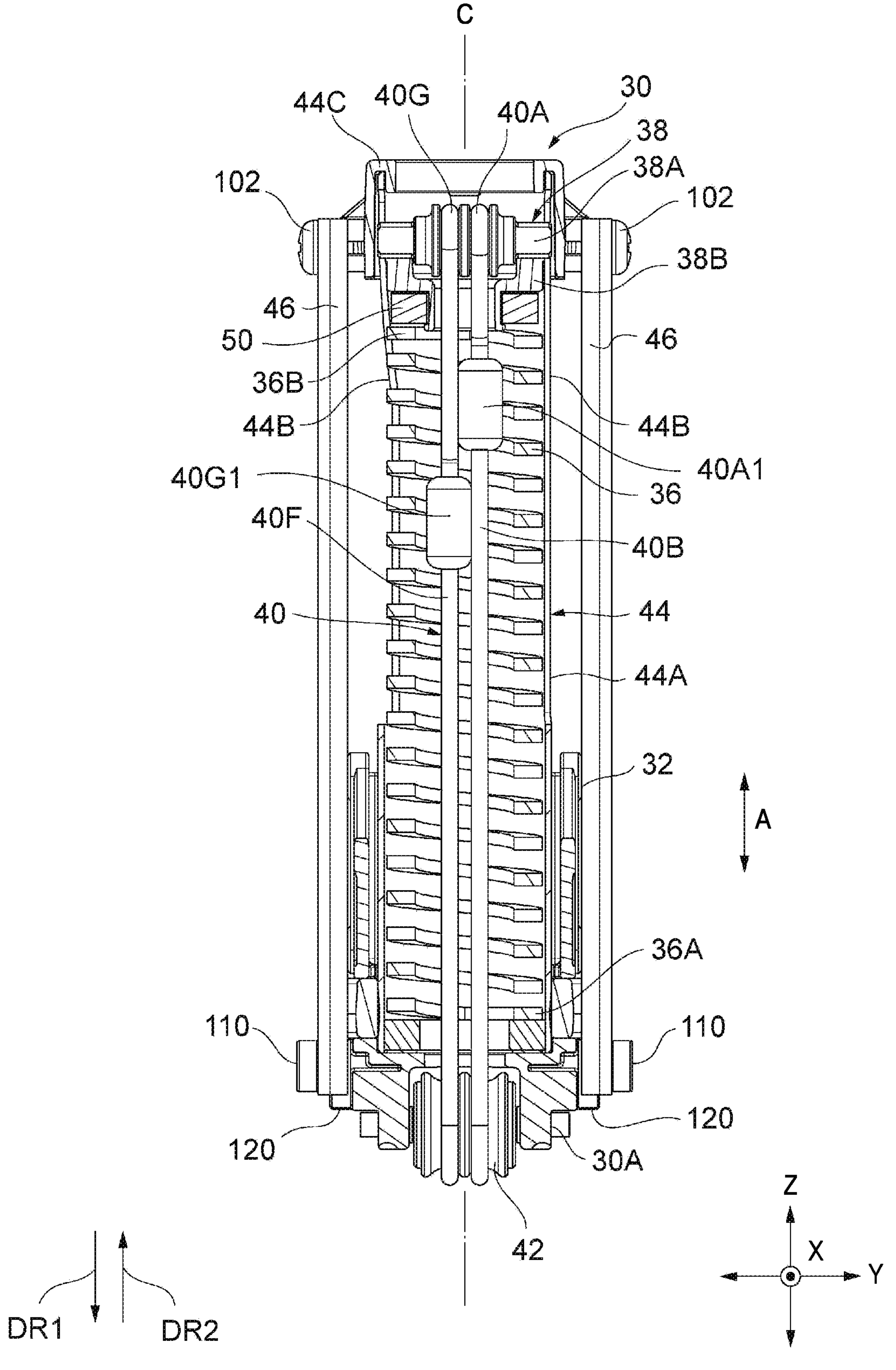
FIG. 5 is a cross-sectional view of the plunger assembly in a state where the coil spring is extended when the plunger assembly is viewed from a front surface.
Figure 6:
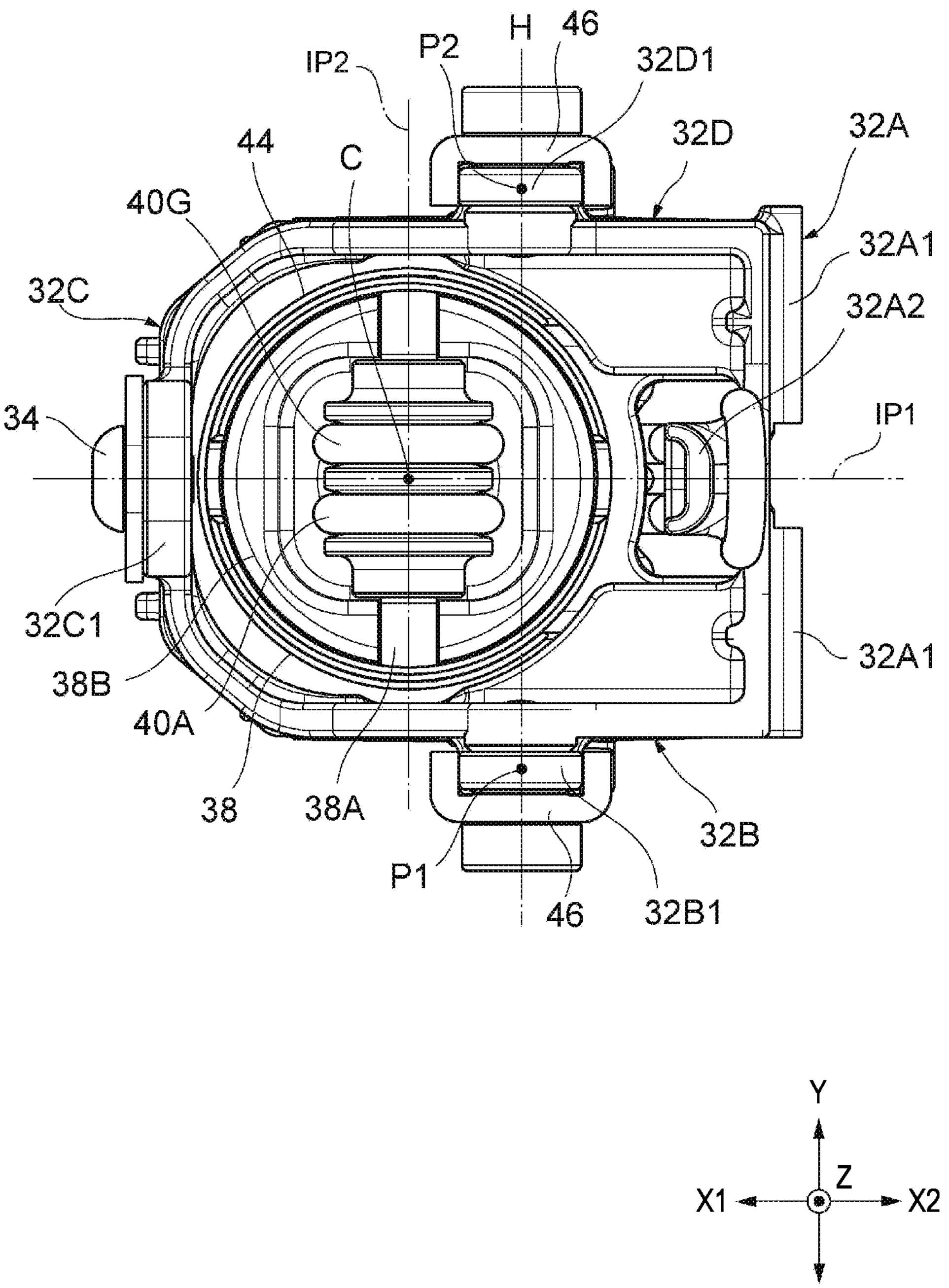
FIG. 6 is a cross-sectional view of the plunger assembly in a top view.
Figure 7:
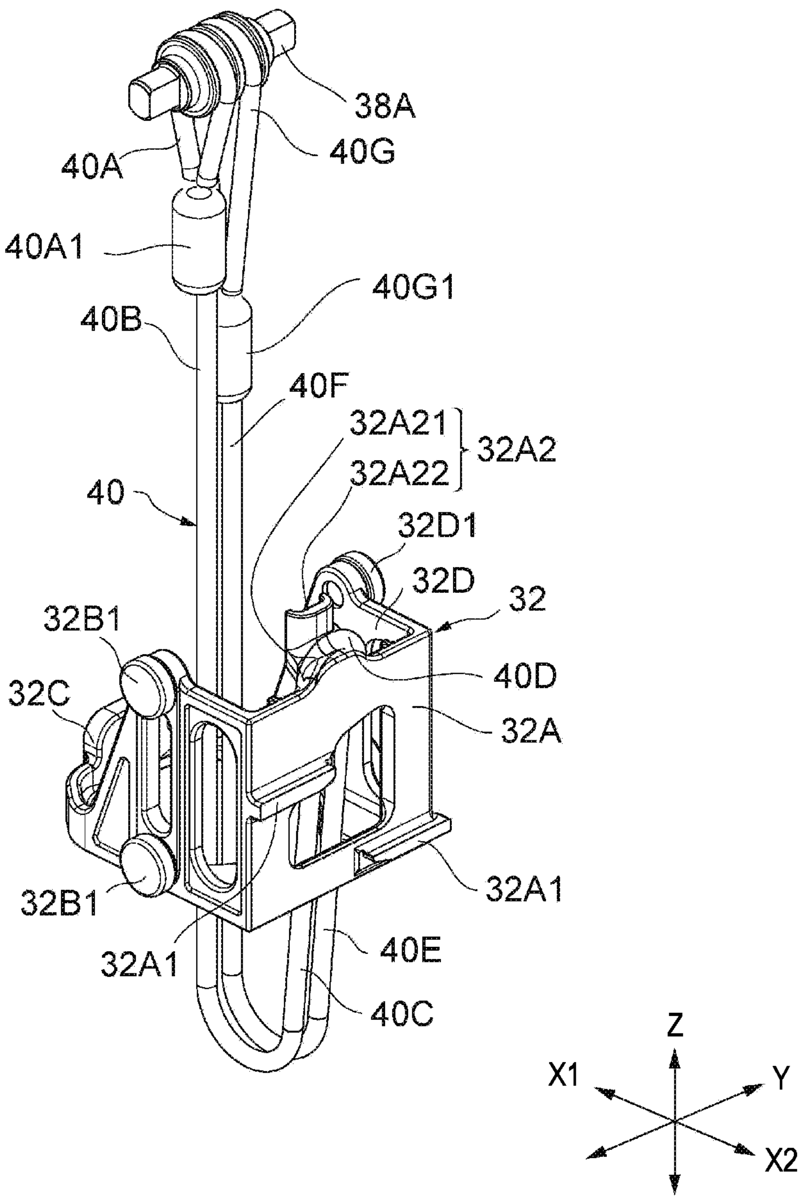
FIG. 7 is a perspective view showing a plunger and a wire engaged with a moving member.

The driving tool 10 further includes a plunger assembly 30. FIG. 3 is a perspective view of the plunger assembly 30, FIG. 4 is a cross-sectional view of the plunger assembly in a state where the coil spring 36 is in a most contracted state when the plunger assembly 30 is viewed from a side surface, and FIG. 5 is a cross-sectional view of the plunger assembly in a state where the coil spring is most extended when the plunger assembly is viewed from a front surface. FIG. 6 is a cross-sectional view of the plunger assembly 30 in a top view. FIG. 7 is a perspective view showing the plunger 32, a pin 38A that is a part of the moving member 38, and the wire 40 that is engaged with the plunger 32 and the moving member 38.

As shown in FIGS. 4 to 7, the plunger assembly 30 includes, for example, the driver 34, the plunger 32, the coil spring 36, the moving member 38, the wire 40, the pulley 42, a cylinder 44 that accommodates the coil spring 36, and a pair of guide rails 46 that restrict a moving direction of the plunger 32.

The driver 34 is a member that comes into contact with and strikes the fastener F so as to launch the fastener F. For example, the driver 34 according to the present embodiment is formed of a metal rigid body formed in an elongated rod shape extending in the launch direction DR1 of the fastener F. Since the fastener F is disposed on an extension line of the driver 34, when the driver 34 moves in the launch direction DR1, a front end of the driver 34 strikes the fastener F. A rear end of the driver 34 is connected to the plunger 32 and is configured to move integrally with the plunger 32.

The plunger 32 is a member configured to move from the top dead center to the bottom dead center so as to move integrally with the driver 34 and launch the fastener F. As shown in FIG. 7, the plunger 32 includes four side wall portions including: a first side wall portion 32A with which the wire 40 is engaged; a second side wall portion 32B that is connected to the first side wall portion 32A substantially at a right angle and is engaged with each guide rail 46; a third side wall portion 32C with which the driver 34 is engaged, the third side wall portion 32C being connected to the second side wall portion 32B substantially at a right angle and provided substantially parallel to the first side wall portion 32A; and a fourth side wall portion 32D that is connected to the third side wall portion 32C and the first side wall portion 32A substantially at a right angle so as to be provided substantially parallel to the second side wall portion 32B, and is engaged with each guide rail 46. The cylinder 44, which will be described later, is disposed in a hollow region surrounded by the four side wall portions.

On an outer wall surface of the first side wall portion 32A, gear engagement portions 32A1 that are two convex portions provided at different heights are provided. The plunger 32 is configured to move from the bottom dead center toward the top dead center against an elastic force (an urging force) of the coil spring 36 by engagement between the gear engagement portions 32A1 and the gear 22, which will be described later. The top dead center of the plunger 32 is set in a region on an upper end side of the tool body 12, and the bottom dead center is set in a region between the top dead center and the nose portion 12D. Therefore, when the plunger 32 moves from the top dead center to the bottom dead center, the plunger 32 moves in the launch direction DR1 so as to approach the outlet 12A, and when the plunger 32 moves from the bottom dead center to the top dead center, the plunger 32 moves in the separating direction DR2 so as to be separated from the outlet 12A.

The first side wall portion 32A of the plunger 32 is further provided with a wire engagement portion 32A2. The wire engagement portion 32A2 is formed in a hook shape. The wire engagement portion 32A2 includes a first portion 32A21 formed to protrude in an inward direction from an inner wall surface of the first side wall portion 32A (that is, in a direction approaching the third side wall portion 32C), and a second portion 32A22 extending in a direction approaching the top dead center from an end portion of the first portion 32A21.

A surface facing the top dead center of the first portion 32A21 serves as a pressure receiving surface configured to apply a force in the launch direction DR1 from the wire 40 to the plunger 32. In addition, the second portion 32A22 restricts the wire 40 from being displaced in the direction approaching the third side wall portion 32C. Further, since the first portion 32A21 is formed to protrude in the direction approaching the third side wall portion 32C, the wire 40 engaged with the pressure receiving surface of the first portion 32A21 can be extended along the inner wall surface of the first side wall portion 32A. Therefore, it is also possible to prevent the wire 40 from being displaced in a direction away from the third side wall portion 32C. In addition, the wire engagement portion 32A2 is formed symmetrically relative to a virtual plane IP1 (FIG. 6) that is parallel to planes approximating the second side wall portion 32B and the fourth side wall portion 32D and has the same distance from both planes. With such a configuration, it is possible to prevent the plunger 32 from being inclined due to imbalance of forces acting on the plunger 32 from the wire 40.

As shown in FIGS. 6 and 7, the second side wall portion 32B and the fourth side wall portion 32D are formed symmetrically relative to the virtual plane IP1. The second side wall portion 32B and the fourth side wall portion 32D are respectively provided with guide rollers 32B1 and 32D1 configured to engage with the guide rails 46. Since two of the guide rollers 32B1 and 32D1 are provided on the top dead center side and the bottom dead center side, respectively, by engaging each two guide rollers 32B1 and 32D1 with the guide rails 46, respectively, it is possible to prevent the inclination of the plunger 32 at the time of movement.

The third side wall portion 32C is provided with a driver engagement portion 32C1 that is formed symmetrically relative to the virtual plane IP1 and to which the rear end of the driver 34 is connected. Therefore, it is possible to prevent the plunger 32 from inclining due to a reaction force received by the plunger 32 when the driver 34 strikes the fastener F.

As shown in these drawings, the plunger 32 is configured such that a distance between the driver engagement portion 32C1 and the outlet 12A is shorter than a distance between the wire engagement portion 32A2 and the outlet 12A (the wire engagement portion 32A2 is located farther away from the outlet 12A in the separating direction DR2 than the driver engagement portion 32C1) when the moving direction of the plunger 32 (a direction connecting the top dead center and the bottom dead center) is used as a reference.

As shown in FIG. 3, the cylinder 44 is a member that accommodates the coil spring 36 and guides a moving direction of the pin 38A that forms a part of the moving member 38. The cylinder 44 according to the present embodiment includes a cylindrical portion 44A that is formed in a cylindrical shape, and a cap portion 44C that corresponds to a lid of the cylindrical portion 44A. The cylinder 44 penetrates the hollow region surrounded by the four side wall portions of the plunger 32, and is fixed to the housing 12 (a base portion 30A of the plunger assembly 30) such that the moving direction of the plunger 32 and a central axis C of the cylinder 44 are substantially parallel to each other.

As shown in FIGS. 4 and 5, the coil spring 36 that is formed of a compression spring that can extend and contract in a direction A along the central axis C of the cylinder 44 (also referred to as a central axis direction or an extension-contraction direction), that is, in the moving direction of the plunger 32, is accommodated inside the cylinder 44. As a result, the cylinder 44 serves as a guide member configured to allow the coil spring 36 to extend and contract straight along the axis. One end 36A of the coil spring 36 is placed on a bottom surface of the cylinder on an outlet side (on the bottom dead center side of the plunger 32). A rubber washer may be provided between the coil spring 36 and the bottom surface of the cylinder. The moving member 38 is disposed on the other end 36B of the coil spring 36, and tension is applied to the moving member 38 by the wire 40 toward the one end 36A (toward the lower side). Therefore, the other end 36B of the coil spring and the moving member 38 are both configured to be movable. When the coil spring 36 is compressed from an extended state, the other end 36B of the coil spring 36 and the moving member 38 are moved in the launch direction DR1, and when the coil spring 36 is extended and restored from a compressed state, the other end 36B of the coil spring and the moving member 38 are moved in the separating direction DR2 so as to be separated from the outlet 12A. A buffer member 50 may be interposed between the other end 36B of the coil spring 36 and the moving member 38. As shown in FIG. 3, a pair of holes 44B extending parallel to the central axis C, that is, parallel to the extension-contraction direction A of the coil spring 36, are formed in a wall portion of the cylinder 44.

As shown in FIGS. 4 and 5, the moving member 38 is directly or indirectly engaged with a part of the wire 40 so as to move the wire 40 along with extension and contraction of the coil spring 36 (movement of the other end 36B). The moving member 38 according to the present embodiment includes a cylindrical portion 38B that is disposed at the other end 36B of the coil spring, and the pin 38A that is fixed to the cylindrical portion 38B and with which both end portions of the wire 40 are engaged. In the present embodiment, the pair of holes 44B formed in the wall portion of the cylinder 44 shown in FIG. 3 are formed at positions intersecting a virtual plane IP2 that is parallel to two planes approximating the first side wall portion 32A and the third side wall portion 32C of the plunger 32 and passes through the central axis C of the cylinder 44 and the coil spring 36 as shown in FIG. 6. In addition, two end portions of the pin 38A are engaged with the pair of holes 44B such that an extension direction of the pin 38A is substantially parallel to the virtual plane IP2. Therefore, even when the moving member 38 including the pin 38A is moved in the central axis direction A of the cylinder 44 in accordance with the extension or compression of the coil spring 36, it is possible to prevent the pin 38A and the wire 40 from being twisted in a circumferential direction of the cylinder 44.

As shown in FIGS. 4 and 5, the wire 40 is a member that is attached to the moving member 38 and the plunger 32 so as to interlock the moving member 38 and the plunger 32. In the present embodiment, one end of the wire 40 is formed in a ring shape, the pin 38A is inserted into the portion formed in the ring shape and thus the pin 38A is engaged therein. The wire 40 that engages with the pin 38A passes through a shaft hole of the cylindrical portion 38B of the moving member 38, extends in the launch direction DR1 along the central axis C of the coil spring 36, passes through a hole formed in the bottom surface of the cylinder 44 and is then wound around the pulley 42 so as to change a direction thereof, extends in the separating direction DR2, and engages with the pressure receiving surface of the wire engagement portion 32A2 of the plunger 32. Subsequently, the wire 40 extends in the launch direction DR1, then is wound around the pulley 42 so as to change the direction thereof, and extends in the separating direction DR2 along the central axis of the coil spring 36. The other end of the wire 40 is formed in a ring shape, the pin 38A is inserted into the portion formed in the ring shape and thus the pin 38A is engaged therein. Therefore, the both ends of the wire 40 are engaged with the pin 38A, and an intermediate portion of the wire 40 is engaged with the plunger 32.

That is, the wire 40 includes: a first portion 40A including the one end portion that engages with the moving member 38; a second portion 40B including a portion that is connected to the first portion 40A and extends in the launch direction DR1; a third portion 40C including a portion that is connected to the second portion 40B and extends substantially in the separating direction DR2; a fourth portion 40D that is connected to the third portion 40C and engages with the plunger 32; a fifth portion 40E including a portion that is connected to the fourth portion 40D and extends substantially in the launch direction DR1; a sixth portion 40F including a portion that is connected to the fifth portion 40E and extends in the separating direction DR2; and a seventh portion 40G including the other end portion that is connected to the sixth portion 40F and engages with the moving member 38. As shown in FIG. 7, each of the first portion 40A and the seventh portion 40G of the wire 40 constitutes an end portion of the wire 20, and is formed in a ring shape. The first portion 40A and the seventh portion 40G form the ring shape by folding back the end portions of the wire and crimping the wire with sleeves 40A1 and 40G1, respectively. In addition, the first portion 40A and the seventh portion 40G displace positions of the sleeve 40A1 of the first portion 40A and the sleeve 40G1 of the seventh portion 40G in the up-down direction by changing sizes of link shapes thereof. As a result, the sleeves 40A1 and 40G1 can be disposed on an inner side of the coil spring 36 while maintaining a small inner diameter of the coil spring 36.

As shown in FIG. 2, a drive mechanism configured to move the plunger 32 from the bottom dead center to the top dead center includes the motor 20 and the gear 22. The motor 20 according to the present embodiment is constituted by a three-phase DC brushless motor, and is disposed, for example, on a front side of the bridge portion 12C in the housing 12 such that an output shaft of the motor 20 is substantially perpendicular to the launch direction DR1 and the separating direction DR2. A gear whose rotation shaft is the output shaft of the motor 20 and a first gear 22A constituting the gear 22 mesh with each other, and the first gear 22A meshes with a second gear 22B constituting the gear 22. The first gear 22A is disposed in the separating direction DR2 relative to the gear of the output shaft of the motor 20, and the second gear 22B is disposed in the separating direction DR2 relative to the first gear 22A. Each of the first gear 22A and the second gear 22B is provided with a torque roller (not shown) that is parallel to the rotation shaft and protrudes in a direction approaching the outer wall surface of the first side wall portion 32A of the plunger 32. The torque roller rotates about a central axis of the first gear 22A (the second gear 22B) in accordance with rotation of the first gear 22A (the second gear 22B). Since the central axis of the first gear 22A (the second gear 22B) is parallel to the output shaft of the motor 20, the torque roller reciprocates in the launch direction DR1 and the separating direction DR2 in accordance with the rotation of the first gear 22A (the second gear 22B). When the plunger 32 is located in the vicinity of the bottom dead center, the torque roller of the first gear 22A is engaged with one convex portion provided on the bottom dead center side as the gear engagement portion 32A1. Since the torque roller moves in the separating direction DR2 in accordance with the rotation of the first gear 22A, the gear engagement portion 32A1 of the plunger 32 is pushed up in the separating direction DR2, and thus the plunger 32 can be moved in the separating direction DR2. When the torque roller of the first gear 22A moves farthest in the separating direction DR2, the torque roller of the second gear 22B engages with the other convex portion provided on the top dead center side as the gear engagement portion 32A1. Since the torque roller moves in the separating direction DR2 in accordance with the rotation of the second gear 22B, the gear engagement portion 32A1 of the plunger 32 is further pushed up in the separating direction DR2, and thus the plunger 32 can be further moved in the separating direction DR2. When the torque roller of the second gear 22B moves farthest in the separating direction DR2, the plunger 32 reaches the top dead center, and engagement between the gear engagement portion 32A1 and the second gear 22B is released.

Various techniques can be used as means for moving the plunger through using a gear or the like driven by the motor and releasing engagement between the gear or the like and the plunger at the top dead center so as to move the plunger toward the bottom dead center.

The driving tool 10 further includes a control unit (not shown) configured to drive the motor 20. The control unit is mounted on a PCB board 24 (FIG. 2) disposed in the bridge portion 12C between the motor 20 and the battery B. The control unit includes: a nonvolatile semiconductor memory (for example, a flash memory) that stores a computer program configured to execute arithmetic processing and the like described in the present embodiment such as a control program of the motor 20; a volatile semiconductor memory (SRAM and DRAM) that temporarily stores data such as an arithmetic processing result; a microcontroller that executes the computer program read from the semiconductor memory and generates a control command (a PWM signal supplied to a base (or a gate) of an inverter circuit); a driver circuit that generates a drive signal based on the control command; and the like. The driver circuit is constituted by an inverter circuit connected in a three-phase bridge manner between DC buses connected to a positive terminal and a negative terminal, which are output terminals of the battery B. An output terminal of the driver circuit is connected to a three-phase winding constituting a stator of the motor 20.

[Driving Method]

Hereinafter, a driving method using the driving tool 10 described above will be described.

In an initial state, the plunger 32 stands by at a standby position between the top dead center and the bottom dead center. In such a state, when the operator grips the grip portion 12B, presses the contact arm 12D1 against the driving destination object, and presses down the trigger 12E, the battery B and the motor 20 are electrically connected, and a rotor of the motor 20 starts to rotate.

When the rotor of the motor 20 starts to rotate, the first gear 22A that meshes with the gear directly connected to the output shaft of the motor 20 and the second gear 22B that meshes with the first gear 22A start to rotate. The torque roller provided in the second gear 22B comes into contact with the gear engagement portion 32A1 of the plunger 32 and pushes up the plunger 32 in the separating direction DR2. Since the plunger 32 is connected to the moving member 38 by the wire 40, the moving member 38 moves in the launch direction DR1 while compressing the coil spring 36 in conjunction with the movement of the plunger 32 in the separating direction DR2. As the plunger 32 approaches the top dead center, the coil spring 36 is compressed, and thus the urging force of the coil spring 36 increases.

When the plunger 32 reaches the top dead center, engagement between the plunger 32 and the gear 22 (the torque roller) is released. Therefore, the coil spring 36 in the compressed state extends at once. The moving member 38 moves together with the other end 36B of the coil spring 36 in the separating direction DR2, which is an extension direction of the coil spring 36. Since the moving member 38 is connected to the plunger 32 by the wire 40, the plunger 32 and the driver 34 are moved in the launch direction DR1 in conjunction with the movement of the moving member 38 in the separating direction DR2. When the plunger 32 is lowered toward the bottom dead center, the driver 34 that moves in the launch direction DR1 together with the plunger 32 launches the fastener F supplied to the nose portion 12D in the launch direction DR1. The fastener F is launched from the outlet 12A.

Next, the rotor of the motor 20 continues to rotate, and the plunger 32 in the vicinity of the bottom dead center is moved to the standby position. The torque roller provided in the first gear 22A comes into contact with the gear engagement portion 32A1 of the plunger 32 and pushes up the plunger 32 in the separating direction DR2. When the plunger 32 reaches the standby position, the rotor of the motor 20 stops rotating. As a result, the driving of the fastener F is completed. Thereafter, when subsequently driving the fastener F, the trigger 12E is returned once and pressed again, and thus the rotor of the motor 20 is rotated again and the above-described operation is performed so as to drive the fastener F.

[Arrangement of Guide Rails]

Figure 8:
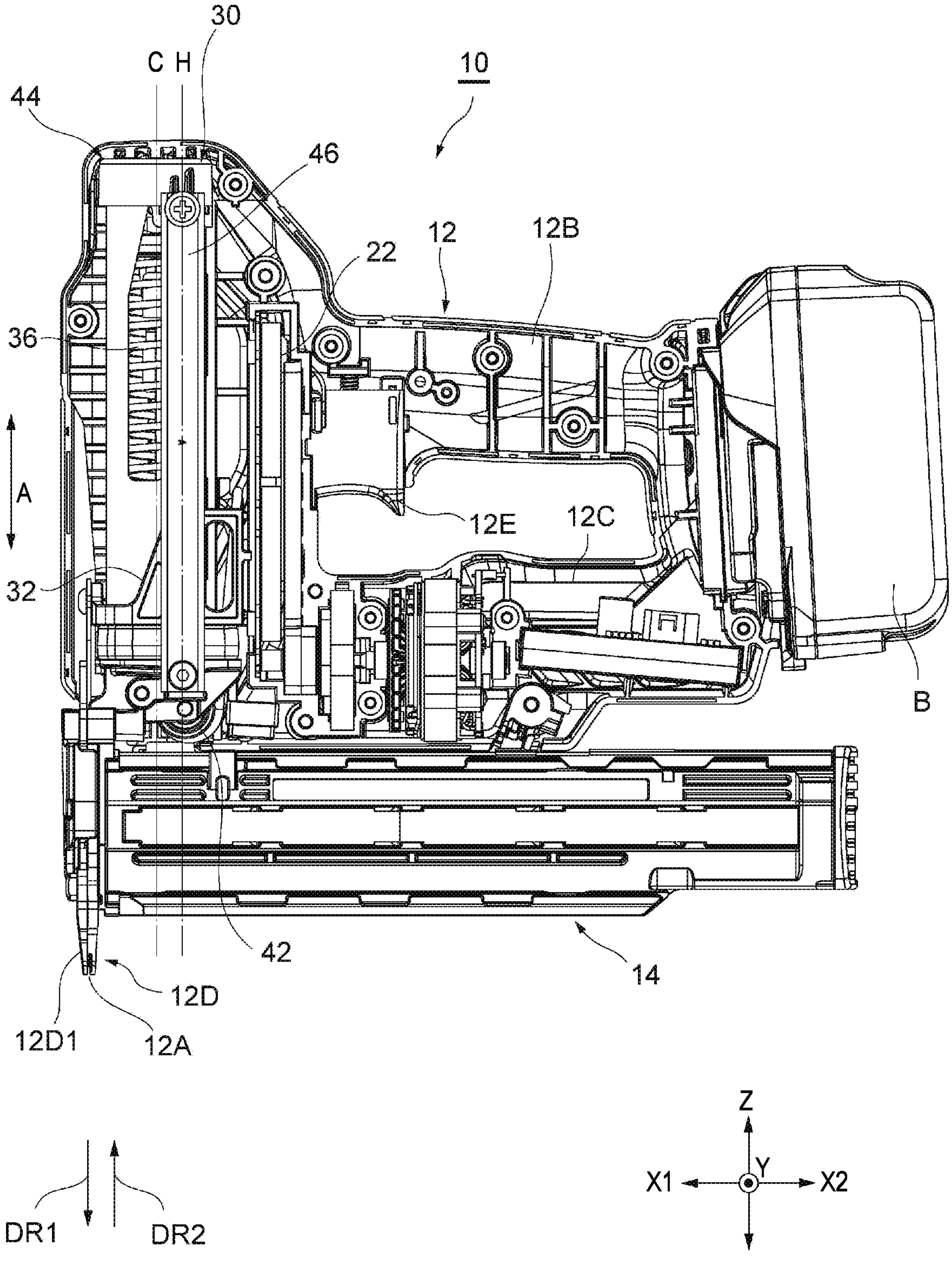
FIG. 8 is a cross-sectional view showing an internal structure of the driving tool when the driving tool is viewed from a side surface.

The driving tool 10 according to the present invention is characterized by arrangement of the guide rails 46 of the plunger assembly 30. Hereinafter, an example of the arrangement of the guide rails 46 will be described. FIG. 8 is a cross-sectional view showing an internal structure of the driving tool 10 when the driving tool 10 is viewed from a side surface, FIG. 9 is a side view of the plunger assembly 30, and FIG. 10 is a cross-sectional view of the plunger assembly 30 as viewed from a side surface.

As shown in FIGS. 8, 9, 3 and 5, the guide rails 46 extend along the central axis direction A (the up-down direction Z) that is a first direction of the cylinder 44 and the coil spring 36. The guide rails 46 are disposed on both sides sandwiching the cylinder 44 in the left-right direction Y.

Figure 9:
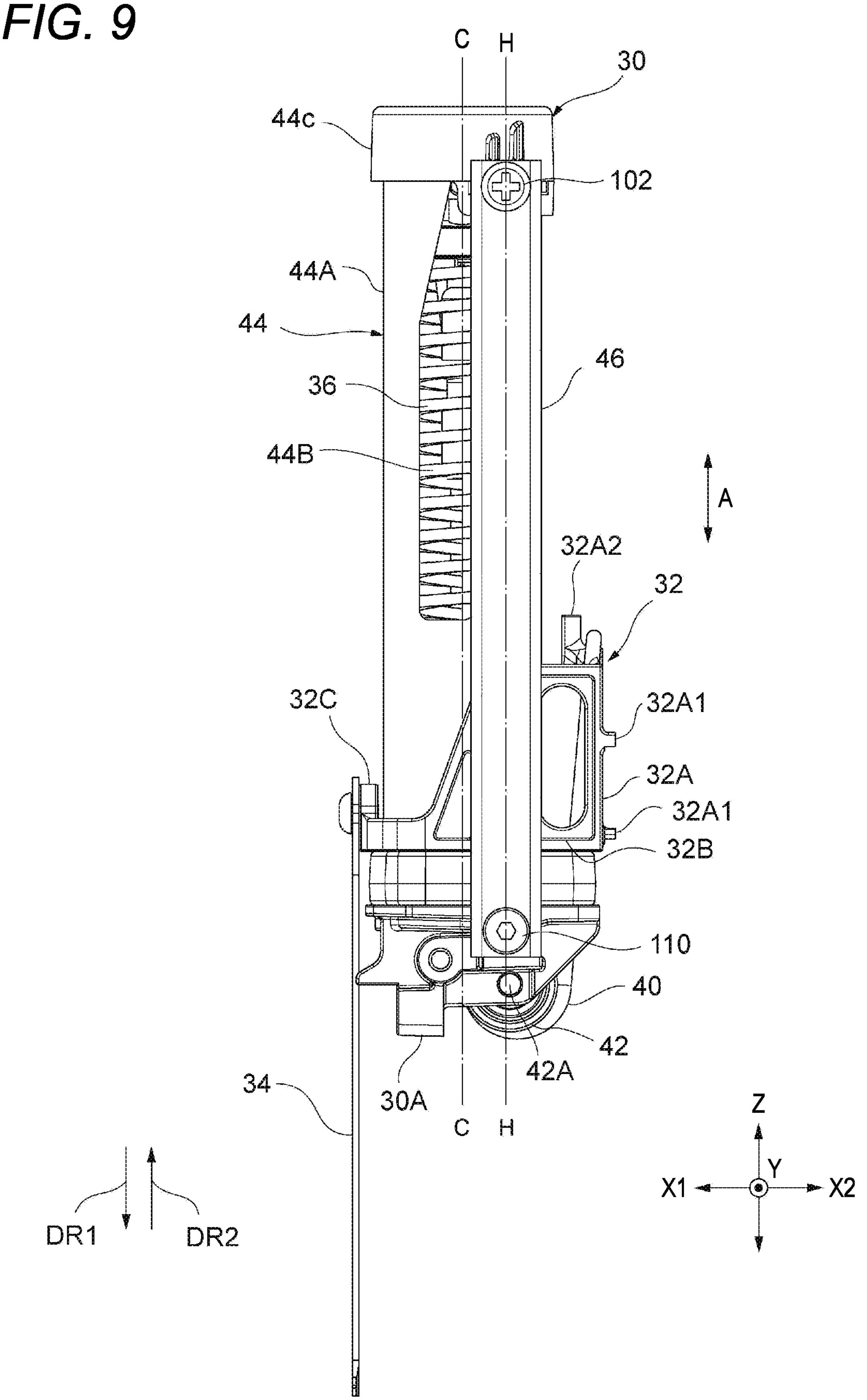
FIG. 9 is a side view of the plunger assembly.

As shown in FIGS. 8 and 9, each guide rail 46 is disposed at a position deviated toward the rearward direction X2 relative to the central axis C of the cylinder 44 and the coil spring 36 in a side view of the plunger assembly 30 as viewed from a side surface in the left-right direction Y. That is, as shown in FIG. 6, in a plan view (top view) as viewed from the central axis direction A of the cylinder 44 and the coil spring 36, the guide rails 46 are arranged such that a virtual line H connecting the two guide rails 46 does not pass through the central axis C of the coil spring 36 and is deviated toward the rearward direction X2 relative to the central axis C (the virtual plane IP2). The virtual line H connects centers P1 and P2 of the guide rails 46 in the front-rear direction X in the plan view of FIG. 6. The virtual line H of the guide rails 46 is deviated toward the rearward direction X2 by ½ of a width of each guide rail 46 or more relative to the central axis C. Further, the virtual line H of the guide rails 46 may be deviated relative to the central axis C by, for example, ⅕ or more, preferably ⅓ or more, and more preferably ½ or more of a radius of an outer diameter of the coil spring 36. It should be noted that an effect of reducing a width dimension of the driving tool 10 may not be obtained if a "center" of each guide rail 46 in the front-rear direction X is deviated relative to the central axis C of the coil spring 36, and thus is it necessary to deviate the entire guide rail 46 (end portions thereof).

Figure 10:
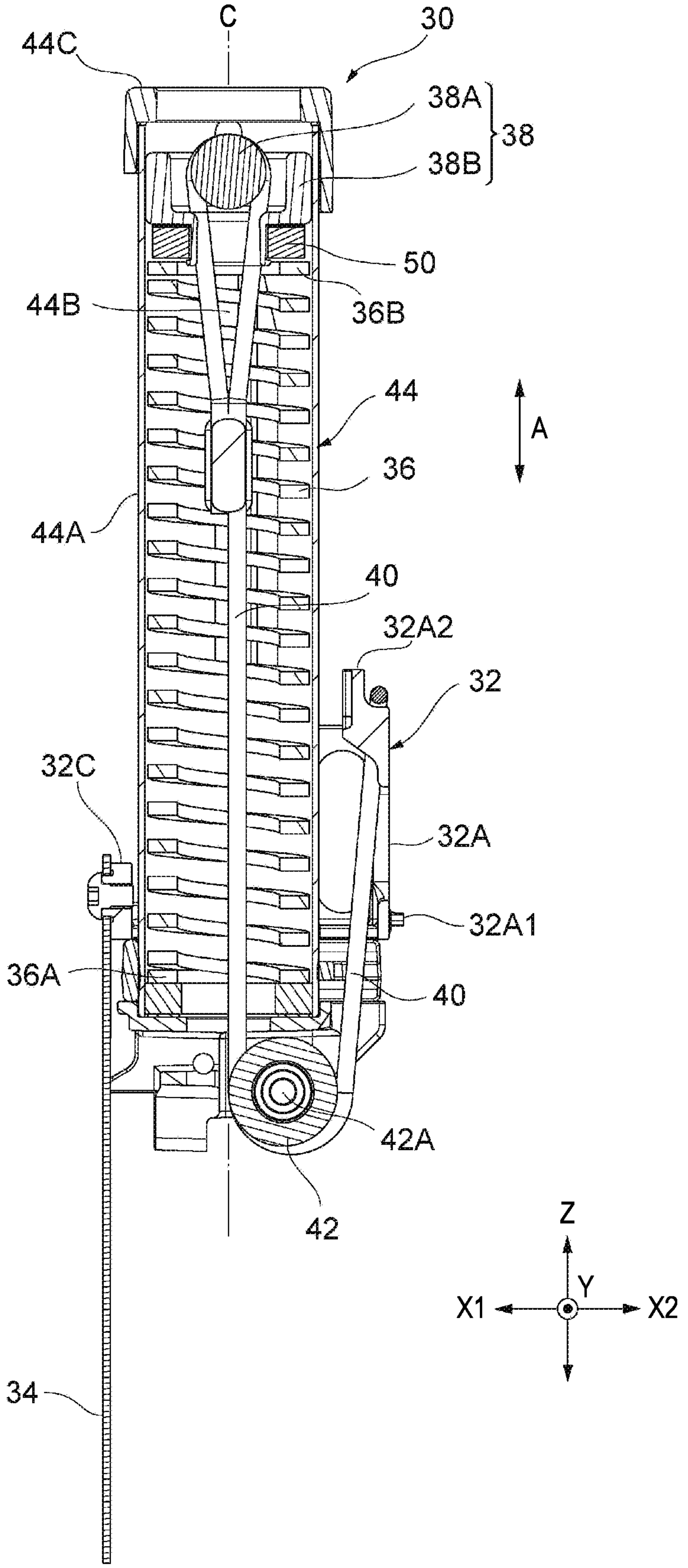
FIG. 10 is a cross-sectional view of the plunger assembly as viewed from a side surface.

As shown in FIG. 10, the plunger assembly 30 is provided with the pulley 42 configured to change the direction of the wire 40. The pulley 42 is rotatably fixed to the base portion 30A of the plunger assembly 30. A rotation shaft 42A of the pulley 42 is directed toward the left-right direction Y orthogonal to the central axis C. The wire 40 passes through the central axis C on the inner side of the coil spring 36 from the moving member 38, protrudes outward from the one end portion 36A of the coil spring 36, reverses the extension direction thereof via the pulley 42, and is engaged with the plunger 32. As shown in FIG. 9, each guide rail 46 is arranged to overlap the rotation shaft 42A of the pulley 42 in a side view of the pulley 42 as viewed from a rotation shaft direction (the left-right direction Y) thereof. It is sufficient that at least a part of the guide rail 46 overlaps with the rotation shaft 42A of the pulley 42, and a virtual plane H (a virtual plane that includes the virtual line H in FIG. 6 and is perpendicular to the front-rear direction X) at a center of the guide rail 46 may not coincide with the rotation shaft 42A. However, the virtual plane H and the rotation shaft 42A may also coincide with each other.

Figure 11:
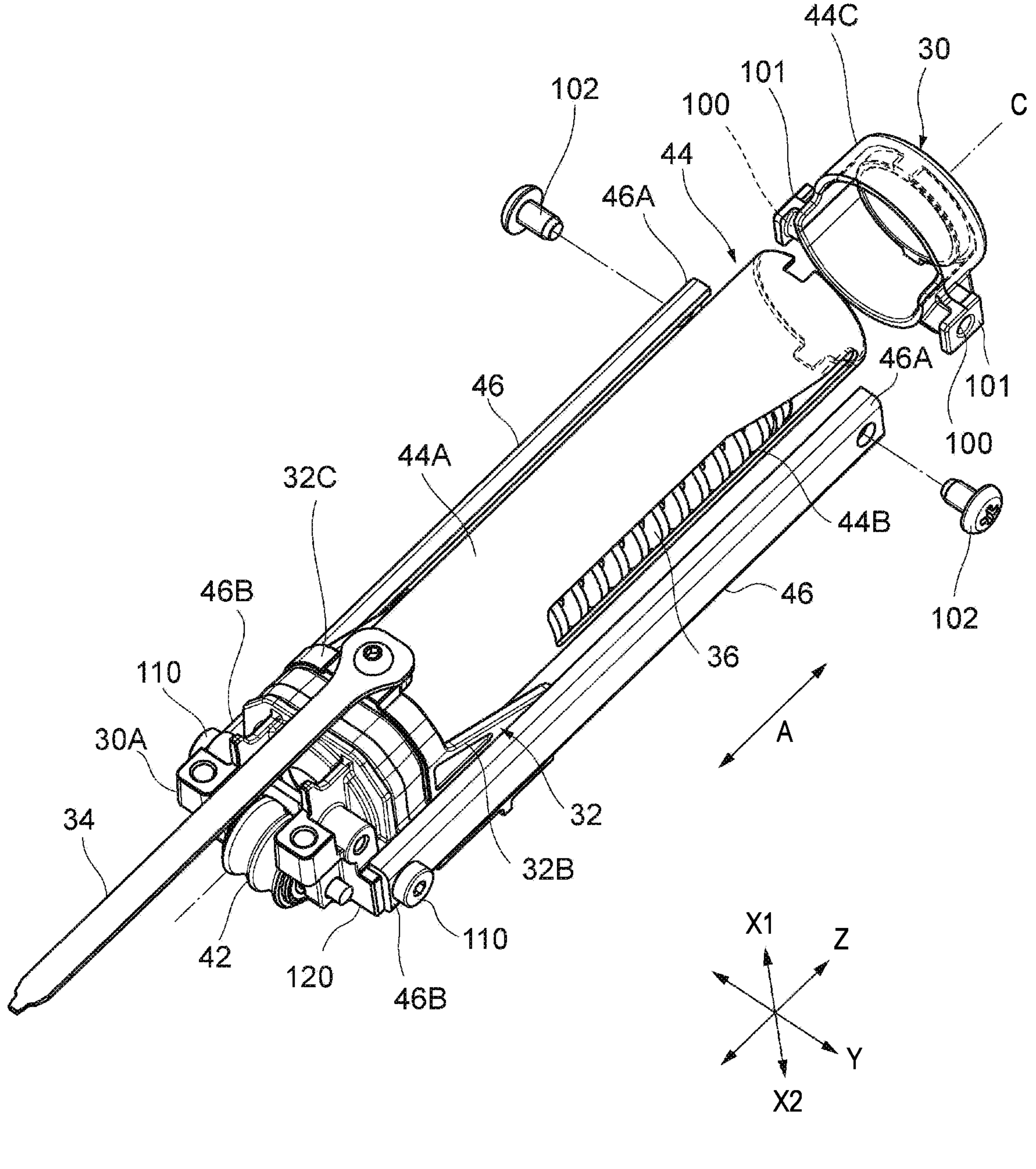
FIG. 11 is an exploded view of a part of a cylinder and a guide rail.

FIG. 11 is an exploded view of a part of the guide rails 46 and the cylinder 44. The cylinder 44 includes the cylindrical portion 44A and the cap portion 44C. The cylindrical portion 44A has a cylindrical shape whose both ends are opened, and is erected in the extension-contraction direction A of the coil spring 36 relative to the base portion 30A (the tool body 12) of the plunger assembly 30. An end (an upper end), which is located on the extension direction side of the coil spring 36, of the cylindrical portion 44A is closed by the cap portion 44C. The cylindrical portion 44A and the cap portion 44C are fitted to each other.

The cap portion 44C includes, for example, a pair of fixing portions 101 each including a screw hole 100 on both sides in the left-right direction Y orthogonal to the central axis C. A first end portion 46A on an upper side of each guide rail 46 (on the top dead center side of the plunger 32) is fixed to each fixing portion 101 of the cylinder 44 by a screw 102. A second end portion 46B on a lower side of each guide rail 46 (on the bottom dead center side of the plunger 32) is fixed to the base portion 30A (the tool body 12) of the plunger assembly 30 by a screw 110.

The base portion 30A of the plunger assembly 30 is provided with an inclination prevention portion 120 configured to prevent each guide rail 46 from being inclined relative to the central axis C. The inclination prevention portion 120 is, for example, a plate-shaped body that protrudes outward in the left-right direction Y from the base portion 30A and is abutted against the second end portion 46B of each guide rail 46. A plate surface of the inclination prevention portion 120 supports an end surface of the second end portion 46B of the guide rail 46.

According to the present embodiment, the guide rails 46 extend along the central axis direction A of the coil spring 36, and are arranged on the both sides sandwiching the coil spring 36 and the cylinder 44 such that the virtual line H connecting the guide rails 46 on the both sides of the coil spring 36 is deviated relative to the central axis C of the coil spring 36 in the plan view of the coil spring 36 as shown in FIG. 6 as viewed from the central axis direction A. As a result, each guide rail 46 is offset from the central axis C (the virtual plane IP2) where widths of the coil spring 36 and the cylinder 44 in the left-right direction Y is maximum. Therefore, a width of the plunger assembly 30, and accordingly the width of the driving tool 10 in the left-right direction Y, can be reduced. As a result, a size of the driving tool 10 can be reduced.

In addition, as shown in FIG. 9, each guide rail 46 is arranged to overlap the rotation shaft 42A of the pulley 42 in the side view of the pulley 42 as viewed from the rotation shaft direction thereof. When the plunger 32 is moved, a large load accompanying movement of the wire 40 is applied to the entire plunger assembly 30 via the pulley 42. Since each guide rail 46 is located on the rotation shaft 42A of the pulley 42, the applied load can be supported by the guide rail 46, and thus strength of the entire plunger assembly 30 can be improved.

As shown in FIG. 10, the wire 40 passes through the central axis C on the inner side of the coil spring 36, protrudes outward from the one end portion 36B of the coil spring 36, and is connected to the plunger 32 via the pulley 42. In this case, since each guide rail 46 is disposed on the rotation shaft 42A of the pulley 42, the guide rail 46 also approaches an engagement portion between the plunger 32 and the wire 40. As a result, a moment acting on the guide rail 46 due to a force applied to the engagement portion between the plunger 32 and the wire 40 at the time of driving or the like is reduced. Therefore, strength of the guide rail 46 can be prevented from being deteriorated, and the guide rail 46 can be prevented from being inclined.

The base portion 30A (the tool body 12) of the plunger assembly 30 is provided with the inclination prevention portion 120 configured to prevent each guide rail 46 from being inclined relative to the central axis direction A. As a result, for example, the guide rail 46 can be prevented from inclining due to a moment acting on the guide rail 46 caused by a force generated by the extension of the coil spring 36 at the time of driving or a moment acting on the guide rail 46 caused by a reaction force applied to the driver 34.

As shown in FIG. 8, the coil spring 36 (the plunger assembly 30) is provided at a front portion of the tool body 12, and each guide rail 46 is arranged to be deviated relative to the central axis C of the coil spring 36 toward the rearward direction X2 in the side view of the tool body 12 as viewed from a side surface. As a result, the guide rail 46 is close to the side of the gear 22 or the motor 20 of the tool body 12, and thus the pair of guide rails 46 do not contribute to a width of the front portion of the tool body 12, so that the size of the driving tool 10 can be reduced.

The plunger 32 is moved in the launch direction DR1 of the fastener F by the extension of the coil spring 36, and the extension direction of the coil spring 36 and the launch direction DR1 of the fastener F are opposite to each other. That is, when the fastener F is launched, the coil spring 36 is extended in the separating direction DR2, and the plunger 32 is moved in the launch direction DR1. In this case, since a center of gravity of the coil spring 36 is moved in the separating direction DR2 at the time of driving, reaction caused by movement of the plunger 32 at the time of driving can be absorbed by using the movement of the center of gravity of the coil spring 36. Therefore, since the driving tool 10 has a function of absorbing the reaction generated at the time of driving of the driving tool 10, weight and size of the driving tool 10 can be reduced.

Although a preferred embodiment of the present invention has been described above with reference to the accompanying drawings, the present invention is not limited thereto. It is apparent to those skilled in the art that various changes and modifications can be made within the scope of the spirit described in the claims, and it should be understood that such changes and modifications naturally fall within the technical scope of the present invention.

For example, although each guide rail 46 is arranged to overlap the rotation shaft 42A of the pulley 42 in the side view as viewed from a side surface of the tool body 12 in the above-described embodiment, the guide rail 46 may not overlap the rotation shaft 42A of the pulley 42 and may be arranged further in the rearward direction X2 relative the rotation shaft 42A of the pulley 42, or may be arranged further in the forward direction X1 relative to the rotation shaft 42A of the pulley 42.

Although each guide rail 46 is arranged to be deviated relative to the central axis C of the coil spring 36 toward the rearward direction X2 in the side view as viewed from a side surface of the tool body 12, the guide rail 46 may be arranged to be deviated relative to the central axis C of the coil spring 36 toward the forward direction X1.

The inclination prevention portion 120 may have a structure other than the plate-shaped body. The inclination prevention portion 120 may be provided in a portion other than the base portion 30A of the tool body 12.

Although the extension direction of the coil spring 36 and the launch direction DR1 of the fastener F are opposite to each other in the plunger assembly 30 described in the above embodiment, the present invention can also be applied to cases where the extension direction of the coil spring 36 and the launch direction DR1 of the fastener F are directed to other directions such as to the same direction or to directions forming a right angle.

Other configurations of the driving tool 10 are not limited to those of the above-described embodiment. For example, there may be one coil spring 36 as in the above embodiment, or there may be a plurality of the coil springs 36 arranged in series. The urging member is not limited to the coil spring, and may be another type of spring, an elastic body, or the like. The string-shaped member may be a member other than the wire.

Further, the present invention can be applied to a driving tool for driving a fastener other than a nail. In addition, the present invention can be variously modified within a range of a normal creative ability of those skilled in the art.

The present invention is useful for reducing a size of a driving tool.

The invention claimed is:

1. A driving tool comprising:

a plunger movable in a first direction along a direction in which a fastener is launched;

an urging member that is extendable and contractible in the first direction and serves as a drive source of the plunger; and guide rails configured to guide movement of the plunger in the first direction, wherein the guide rails extend along the first direction of the urging member and are disposed on both sides sandwiching the urging member, wherein a front-rear direction extends perpendicular to the first direction, and each guide rail includes a center in the front-rear direction corresponding to a center with respect to the front-rear direction, and the guide rails are arranged such that a virtual line connecting the centers in the front-rear direction of the guide rails on the both sides of the urging member is deviated from a central axis of the urging member in a plan view of the urging member as viewed from the first direction.

2. The driving tool according to claim 1, further comprising:

a string-shaped member configured to transmit a driving force of the urging member to the plunger; and a pulley on which the string-shaped member is hooked, wherein the guide rails are arranged to overlap a rotation axis of the pulley in a side view of the pulley as viewed from a rotation axis direction thereof.

3. The driving tool according to claim 2, wherein the string-shaped member passes through an inner side of the urging member in a central axis direction, protrudes outward from one end portion of the urging member, and is connected to the plunger via the pulley.

4. The driving tool according to claim 1, wherein the guide rails are fixed to a tool body, and the tool body is provided with an inclination prevention portion that prevents the guide rails from inclining relative to the first direction.

5. The driving tool according to claim 1, wherein the urging member is provided at a front portion of the tool body, and the guide rails are arranged to be deviated toward a rear side of the tool body from the central axis of the urging member in the first direction in a side view as viewed from a side surface of the tool body.

6. The driving tool according to claim 1, wherein the plunger is moved in the launch direction of the fastener by an extension operation of the urging member, and an extension direction of the urging member and the launch direction of the fastener are opposite to each other.

* * * * *